United States Patent

Tada et al.

[11] Patent Number: 5,857,888
[45] Date of Patent: Jan. 12, 1999

[54] METHOD OF MANUFACTURING A PLASMA TORCH ELETRODE

[75] Inventors: Shuji Tada, Higashimatsuyama; Hirokuni Matsuda, Hakone-machi; Jun Aoki, Saitama-ken, all of Japan

[73] Assignee: Prometron Technics Corp., Tokyo, Japan

[21] Appl. No.: 736,855

[22] Filed: Oct. 28, 1996

[51] Int. Cl.$^6$ .................................................. B23K 10/00
[52] U.S. Cl. ...................................... 445/35; 219/121.52
[58] Field of Search ......................... 219/121.52; 445/35

[56] References Cited

U.S. PATENT DOCUMENTS

| | | |
|---|---|---|
| 3,141,953 | 7/1964 | Browning . |
| 3,198,932 | 8/1965 | Weatherly . |
| 3,459,915 | 8/1969 | Swazy et al. . |
| 3,930,139 | 12/1975 | Bykhovsky et al. . |
| 4,304,984 | 12/1981 | Bolotnikov et al. . |
| 4,620,086 | 10/1986 | Ades et al. . |
| 4,766,349 | 8/1988 | Johansson et al. . |
| 5,023,425 | 6/1991 | Severance, Jr. . |
| 5,097,111 | 3/1992 | Severance, Jr. . |
| 5,200,594 | 4/1993 | Okada et al. . |
| 5,628,924 | 5/1997 | Yoshimitsu et al. ............... 219/121.52 |

*Primary Examiner*—Kenneth J. Ramsey
*Attorney, Agent, or Firm*—Wood, Phillips, VanSanten, Clark & Mortimer

[57] ABSTRACT

A method of manufacturing an electrode to be used in a plasma torch includes the steps of providing an insert formed from an electrically-conductive, heat-resistant material, depositing a metal by physical vapor deposition to form a coating on the insert, the metal selected from the group consisting of silver, silver alloy, gold, and gold alloy, providing a holder having a surface with a recess formed therein to receive the insert, placing the insert into the recess, and securing the insert to the holder.

9 Claims, 1 Drawing Sheet

METHOD OF MANUFACTURING A PLASMA TORCH ELETRODE

FIELD OF THE INVENTION

This invention is directed to a method of manufacturing an electrode for use in a plasma torch, and in particular to an electrode having a holder and an insert disposed within the holder.

BACKGROUND OF THE INVENTION

A plasma torch is a device which uses an electrical discharge generated in a space or gap between two oppositely charged bodies to heat and to ionize a stream of gas flowing through the gap. The negatively charged body is referred to as an electrode, while the positively charged body is referred to as an anode. The stream of ionized gas produced when the electrical discharge passes through the gas in the gap from electrode to anode is referred to as a plasma jet.

The plasma torch technology described above has presently been put to a number of different uses. For example, the plasma torch has been used both as a welding tool and a cutting tool in high speed manufacturing processes. The plasma torch may also be used as a tool for developing heat resistant materials. Further, this plasma torch technology has been utilized in high temperature furnaces for the incineration of dangerous waste materials, such as medical waste.

One disadvantage of plasma torch technology is the extremely high temperature environment in which the electrode must operate. These high temperatures lead to rapid electrode erosion, as the electrode material melts, evaporates, or is otherwise transported away from the electrode. The immediate consequence of electrode erosion is a degradation of the plasma jet generation. A further consequence of rapid electrode erosion is that users of this plasma torch technology must factor in the costs of providing numerous replacement electrodes, as well as the sizeable cost of the down-time required to replace the electrodes.

In an attempt to control electrode wear through increased dissipation of heat from the operative portion of the electrode, it is common to fabricate the electrode using a heat-resistant insert embedded in a water-cooled holder. The insert is conventionally selected from the group of electrically conductive materials having high melting point temperatures, such as tungsten (W), molybdenum (Mo), tantalum (Ta) and carbon (C).

If the working gas used is air or oxygen, however, an oxidation reaction can occur where the working gas contacts the surface of the insert. As the melting temperature of the oxidation product of those insert materials mentioned above is typically lower than the melting temperature of the insert material, this oxidation reaction may promote and accelerate the rate of melting of the electrode. As a consequence, the erosion of the electrode may still occur at a rapid rate, and the life of the electrode may be correspondingly relatively brief.

Consequently, to reduce the rate of electrode erosion it is also known to use an electrode material with an oxidation product which has a melting point temperature which is equal to or higher than the melting point temperature of the electrode material. Such materials include zirconium (Zr) and hafnium (Hf).

Even with these further precautions, the electrode may fail rapidly because of the heat transfer resistance of the holder material and the heat transfer resistance existing at the insert-holder interface. When the amount of heat generated during the creation of the plasma jet and transferred to the insert exceeds the capacity of the holder, commonly manufactured from copper, to carry the heat away from the insert, the material of the holder surrounding the insert may begin to melt. As a consequence, some of the holder material melt may flow towards the insert, and contaminate the insert material. The impurities thus created in the insert material have a tendency to cause melting of the insert to accelerate, increasing the rate of degradation of the electrode and reducing the life of the electrode.

U.S. Pat. No. 3,930,139 to Bykhovsky et al. describes that the life of an electrode formed using a hafnium or hafnium insert and a water-cooled holder may be increased by placing a spacer between the insert and the holder. Specifically, Bykhovsky et al. suggest that the spacer be formed from aluminum or an aluminum alloy with a radial thickness of 0.01 to 0.2 mm. However, use of aluminum in an oxidizing atmosphere can result in an oxidation product of aluminum being formed, which oxidation product may make the spacer unstable and reduce the durability of the electrode.

U.S. Pat. No. 5,097,111 to Severance describes that the life of an electrode in an oxidizing atmosphere may be increased through the introduction of a sleeve between an insert made, for example, of hafnium and a holder made from copper or a copper alloy. Severance discloses that the sleeve has a radial thickness of at least about 0.01 inches. Severance also discloses that the sleeve is formed of a material having a work function which is greater than that of the material of the holder and the insert, for example, silver.

U.S. Pat. No. 3,198,932 to Weatherly describes that the stability of an electrode in a reactive gas atmosphere may be improved by silver-brazing a zirconium insert into a recess in a silver holder. Specifically, Weatherly discloses a method whereby the insert is first dipped in molten silver, thus applying a silver coating to the insert. Silver is then melted in the holder recess, whereupon the insert is inserted into the recess and the holder and insert are heated until silver flows around the insert.

However, both Severance and Weatherly suggest the use of a sleeve or coating which requires a substantial amount of silver to fabricate. Given the cost of silver, and the fact that erosion of the electrode will necessarily require replacement electrodes to be purchased, there is still a major cost consideration for the user of this plasma torch technology.

SUMMARY OF THE INVENTION

According to an aspect of the present invention, a method of manufacturing an electrode to be used in a plasma torch includes the steps of providing an insert formed from an electrically-conductive, heat-resistant material, depositing a metal by physical vapor deposition to form a coating on the insert, the metal selected from the group consisting of silver, silver alloy, gold, and gold alloy, providing a holder having a surface with a recess formed therein to receive the insert, placing the insert into the recess, and securing the insert to the holder.

Moreover, the step of providing an insert formed from an electrically-conductive, heat-resistant material may include the step of providing an insert formed from a material selected from the group consisting of zirconium and hafnium.

Moreover, the method may include the step of providing a holder comprising the step of providing a holder formed from a silver alloy containing a wetting agent selected from the group consisting of zinc, cadmium, nickel, manganese and lead.

Moreover, the method may include the step of depositing a metal by physical vapor deposition comprising the step of depositing a metal by physical vapor deposition to a thickness of 1 to 10 μm.

Moreover, the step of depositing a metal by physical vapor deposition to form a coating on the insert core may include the step of depositing a metal by physical vapor deposition from the group of physical vapor deposition processes consisting of ion plating, sputtering, arc vacuum, arc evaporation, and galvanization to form a coating on the insert core.

According to another aspect of the invention, a method of manufacturing an electrode insert to be used in a plasma torch includes the steps of providing an insert core formed from an electrically-conductive, heat-resistant material, and depositing a metal by physical vapor deposition to form a coating on the insert core, the metal selected from the group consisting of silver, silver alloy, gold, and gold alloy.

Moreover, the step of providing an insert core formed from an electrically-conductive, heat-resistant material may include the step of providing an insert core formed from a material selected from the group consisting of zirconium and hafnium.

Moreover, the step of depositing a metal by physical vapor deposition may include the step of depositing a metal by physical vapor deposition to a thickness of 1 to 10 μm.

Moreover, the step of depositing a metal by physical vapor deposition to form a coating on the insert core may include the step of depositing a metal by physical vapor deposition from the group of physical vapor deposition processes consisting of ion plating, sputtering, arc vacuum, arc evaporation, and galvanization to form a coating on the insert core.

According to a further aspect of the invention, an electrode insert for use in a plasma torch includes an electrically-conductive, heat resistant insert core and a metal coating deposited on the insert core having a thickness of between 1 and 10 μm, the metal coating selected from the group consisting of silver, silver alloy, gold and gold alloy.

Moreover, the electrically-conductive, heat resistant insert core may be formed from a material selected from the group consisting of zirconium and hafnium.

Moreover, the electrode insert may be combined with a holder having a recess, the insert disposed in the recess and secured to the holder. The holder may be formed from a material selected from the group consisting of copper, copper alloy, silver and silver alloy. Alternatively, the holder may be formed from a silver alloy containing a wetting agent selected from the group consisting of zinc, cadmium, nickel, manganese and lead.

DESCRIPTION OF THE PREFERRED EMBODIMENTS

Figure 1:
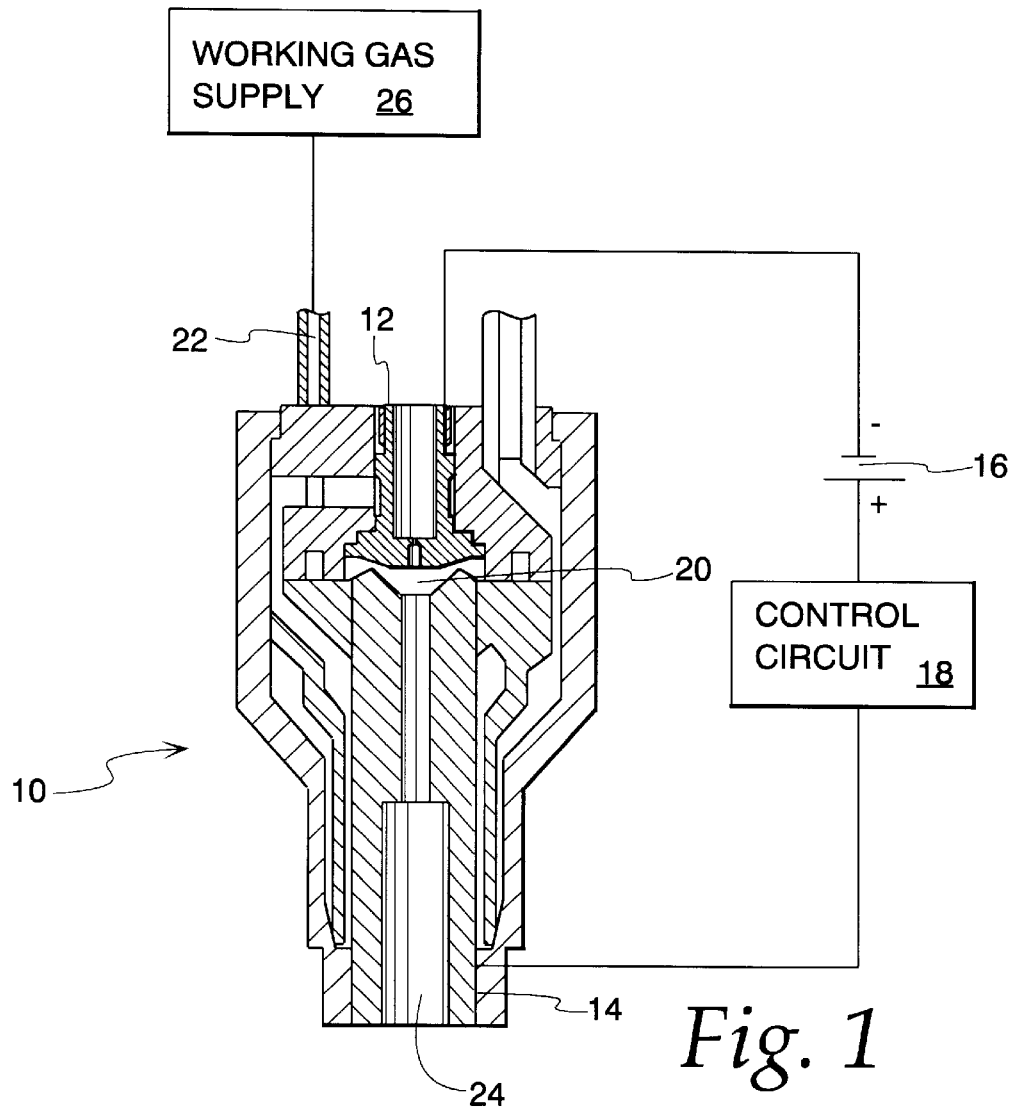
FIG. 1 is a cross-sectional view of a plasma torch utilizing an electrode according to an embodiment of the present invention.

A plasma torch 10 utilizing an embodiment of the present invention is shown in FIG. 1. The plasma torch 10 has an electrode 12 and an anode 14. The electrode 12 and the anode 14 are coupled to the series combination of a DC power supply 16 and a control circuit 18. In particular, the electrode 12 is coupled to the negative side of the power supply 16, while the positive side of the power supply 16 is coupled to the control circuit 18, which is coupled to the anode 14.

The plasma torch 10 includes a series of passages 20, 22, and 24. The passage 20 is located between the electrode 12 and the anode 14. The passage 22 is connected to the passage 20 and transports a working gas, for example oxygen or a mixture of oxygen and air, from a working gas supply 26 to the passage 20. The passage or nozzle 24 is connected to the passage 20 and allows the plasma jet generated in the passage 20 to exit from the plasma torch 10.

In operation, the working gas is initially released through passages 20, 22, and 24 at a predetermined rate while a predetermined voltage is maintained across the passage 20 between the electrode 12 and the anode 14. Once a steady-state release rate is reached for the working gas through the passages 20, 22, and 24, the control circuit 18 generates a high frequency, high voltage pulse which is applied between the electrode 12 and anode 14. The pulse causes a spark, and then an arc, to be generated in the passage 20 between the electrode 12 and the anode 14. This arc completes the electrical circuit connecting the electrode 12, the anode 14, the DC power supply 16, and the control circuit IS.

The passage of the arc from the electrode 12 to the anode 14 in the passage 20 causes the temperature of the working gas in the passage 20 to rise to the point at which the working gas ionizes to form a plasma jet. The introduction of additional working gas upstream of the plasma jet thus generated causes the plasma jet to be forced through the passage 24 and ejected out of the plasma torch 10.

Figure 2:
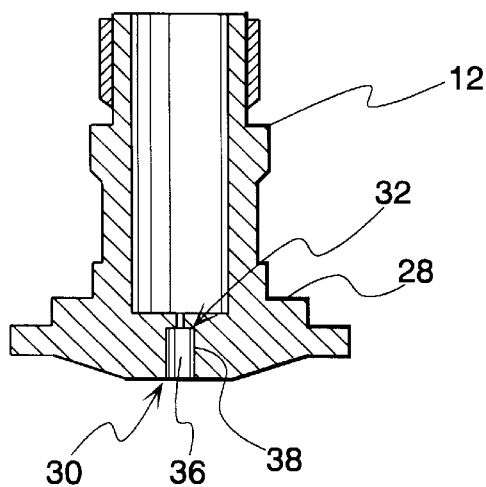
FIG. 2 is an enlarged cross-sectional view of the inventive electrode.

As shown in FIG. 2, the electrode 12 manufactured according to a preferred embodiment of the present invention is assembled from two separate pieces: a water-cooled holder 28 and an insert 30. The holder 28 has a cavity or recess 32 into which the insert 30 is disposed and secured.

The holder 28 is preferably manufactured from silver or silver alloy, although alternatively the holder 28 could be manufactured using copper or copper alloy. Preferably, the silver alloy includes 53–85% silver and 15–30% copper. Any number of wetting or acceleration agents, such as zinc (Zn), Cadmium (Cd), Nickel (Ni), Manganese (Mn) or Lead (Pb), can be introduced into silver alloy to improve the ability of the holder 28 to join to the insert 30, and to hold the insert 30 securely in the recess 32.

The insert 30 has an inner core 36 and an outer coating 38. The inner core 36 is preferably manufactured from a material having high corrosion resistance and high heat resistance, for example, zirconium (Zr) and more preferably hafnium (Hf). The coating 38 is preferably formed using silver, gold, or a gold or silver alloy, and is preferably between 1 and 10 μm in thickness.

The coating 38 is preferably applied to the core 36 using a conventional physical vapor deposition (PVD) process. This PVD process may include ion plating, sputtering, arc vacuum or arc evaporation (PV/ARC), or galvanization processes. The following examples were prepared according to the invention using a conventional PVD ion plating process. During processing, a plasma voltage of 45 V, a plasma current of 90 A, and a vacuum of between 0.001 and 0.002 torrs were used.

EXAMPLE 1

A series of tests was run to measure the performance of an electrode made up of a silver alloy holder and a silver coated insert according to the present invention using the plasma torch as a cutting tool. A first holder, Example 1A, was prepared from a first silver alloy including 60% by weight (wt %) Ag, 19 wt % Cu, 8 wt % Zn, 9 wt % Cd, 2 wt % Ni, 2 wt % Mn. A second holder, Example 1B, was prepared from a second silver alloy including 85 wt % Ag and 15 wt % Cu. A hafnium insert coated with a layer of silver (99.99%) deposited using a PVD ion plating process was fitted into a recess in each of the holders in Examples 1A and 1B.

With the electrodes fitted into a conventional plasma arc cutting machine, an arc voltage of 160 VDC and an arc current of 250 ADC were applied to the electrode. Oxygen ($O_2$) was used as the working gas at a flow rate of 46 liter/minute. The plasma arc cutting machine was activated for an average cutting duration of 4 seconds/cut.

The electrode Example 1A performed 1,143 cuts before the electrode degraded to such a point that the arc moved from the center of the passage 20 to the inner wall of the passage 20. The electrode Example 1B was able to perform 803 cuts before the electrode degraded such that plasma torch failed in the above-mentioned fashion. For comparison, the number of cuts normally expected of a common electrode before failure is 200–250 under the same set of operating conditions. Thus, the electrode using a silver alloy holder and a silver coated insert of the present invention exhibited a significantly higher level of performance than would be expected of a conventional electrode under these same conditions.

EXAMPLE 2

A comparison test was run to measure the level of performance of an electrode including a silver coated insert according to the present invention relative to a conventional electrode with the electrode used as a continuously firing heat generating or furnace element. In this comparison test, a conventional copper alloy holder was used. A first electrode, Example 2A, was made using hafnium, but with no protective coating. A second electrode, Example 2B, was also made using hafnium, but was subsequently coated using silver (99.99%) applied according to a PVD ion plating process to a thickness of 3 µm.

Both Examples 2A and 2B were run at an arc current of 160 ADC and an arc voltage of 250 VDC. Air was used as the working gas, and was supplied at the rate of 150 liters/minute. The plasma torch was run until an erosion depth of 2 mm was achieved at the surface of the insert.

The electrode Example 2A was operational for 50 hours until the surface eroded to a depth of 2 mm. By contrast, the electrode Example 2B was operational for 200 hours until the surface eroded to a depth of 2 mm. Thus, again, the use of a silver coated electrode shows a significant improvement in the level of performance over the conventionally fabricated electrode.

I claim:

1. A method of manufacturing an electrode to be used in a plasma torch, the method comprising the steps of:

providing an insert formed from an electrically-conductive, heat-resistant material;

depositing a metal by physical vapor deposition to form a coating on the insert, the metal selected from the group consisting of silver, silver alloy, gold, and gold alloy;

providing a holder having a surface with a recess formed therein to receive the insert;

placing the insert into the recess; and securing the insert to the holder.

2. The method according to claim 1, wherein the step of providing an insert formed from an electrically-conductive, heat-resistant material comprises the step of providing an insert formed from a material selected from the group consisting of zirconium and hafnium.

3. The method according to claim 1, wherein the step of providing a holder comprises the step of providing a holder formed from a silver alloy containing a wetting agent selected from the group consisting of zinc, cadmium, nickel, manganese and lead.

4. The method according to claim 1, wherein the step of depositing a metal by physical vapor deposition comprises the step of depositing a metal by physical vapor deposition to a thickness of 1 to 10 µm.

5. The method according to claim 1 wherein the step of depositing a metal by physical vapor deposition to form a coating on the insert comprises the step of depositing a metal by physical vapor deposition from the group of physical vapor deposition processes consisting of ion plating, sputtering, arc vacuum, arc evaporation, and galvanization to form a coating on the insert.

6. A method of manufacturing an electrode insert to be used in a plasma torch, the method comprising the steps of:

providing an insert core formed from an electrically-conductive, heat-resistant material; and depositing a metal by physical vapor deposition to form a coating on the insert core, the metal selected from the group consisting of silver, silver alloy, gold, and gold alloy.

7. The method according to claim 6, wherein the step of providing an insert core formed from an electrically-conductive, heat-resistant material comprises the step of providing an insert core formed from a material selected from the group consisting of zirconium and hafnium.

8. The method according to claim 6, wherein the step of depositing a metal by physical vapor deposition comprises the step of depositing a metal by physical vapor deposition to a thickness of 1 to 10 µm.

9. The method according to claim 6 wherein the step of depositing a metal by physical vapor deposition to form a coating on the insert core comprises the step of depositing a metal by physical vapor deposition from the group of physical vapor deposition processes consisting of ion plating, sputtering, arc vacuum, arc evaporation, and galvanization to form a coating on the insert core.

\* \* \* \* \*